US012772931B2

(12) United States Patent
Magisson

(10) Patent No.: US 12,772,931 B2
(45) Date of Patent: Oct. 27, 2026

(54) HARVESTER IMPLEMENT WITH CONDITIONING IMPELLER HAVING A CHOPPING FUNCTION

(71) Applicant: DEERE & COMPANY, Moline, IL (US)

(72) Inventor: Emmanuel R. Magisson, Zweibrücken (DE)

(73) Assignee: DEERE & COMPANY, Moline, IL (US)

(*) Notice: Subject to any disclaimer, the term of this patent is extended or adjusted under 35 U.S.C. 154(b) by 233 days.

(21) Appl. No.: 18/794,180

(22) Filed: Aug. 5, 2024

(65) Prior Publication Data

US 2024/0389508 A1 Nov. 28, 2024

Related U.S. Application Data

(63) Continuation-in-part of application No. 18/417,355, filed on Jan. 19, 2024.

(30) Foreign Application Priority Data

Mar. 27, 2023 (DE) ........................ 102023107613.2

(51) Int. Cl.
*A01D 43/08* (2006.01)
*A01D 43/10* (2006.01)

(52) U.S. Cl.
CPC ............. *A01D 43/08* (2013.01); *A01D 43/10* (2013.01)

(58) Field of Classification Search
CPC ...... A01D 43/08; A01D 43/10; A01D 34/667; A01F 2015/108
See application file for complete search history.

(56) References Cited

U.S. PATENT DOCUMENTS 3,977,165 A * 8/1976 Klinner .................. A01D 43/10
56/192
4,299,078 A * 11/1981 Werner .................. A01D 43/10
56/14.1

(Continued)

FOREIGN PATENT DOCUMENTS

DE 10896 A 11/1952
DE 2418995 A1 11/1975

(Continued)

OTHER PUBLICATIONS

Extended European Search Report and Written Opinion issued in European Patent Application No. 24161507.9 dated Oct. 21, 2024, in 14 pages.

(Continued)

*Primary Examiner* — Cathleen R Hutchins

(57) ABSTRACT

A harvesting machine includes a frame structure. A cutter is coupled to the frame structure for cutting standing crop material. A conveyor rotor is rotatable about a rotor axis relative to the frame structure, and includes a plurality of drivers mounted to an exterior surface of the conveyor rotor. A discharge hood is mounted to the frame structure above the conveyor rotor. The conveyor rotor is configured for rotation about the rotor axis in a first rotational direction for moving crop material over the conveyor rotor, between the discharge hood and the conveyor rotor, for conditioning the crop material. The conveyor rotor is configured for rotation about the rotor axis in a second rotational direction, opposite the first rotational direction, for moving the crop material under the conveyor rotor for cutting the crop material.

9 Claims, 14 Drawing Sheets

(56) References Cited

U.S. PATENT DOCUMENTS

| | | | |
|---|---|---|---|
| 4,790,128 A | 12/1988 | Klinner | |
| 4,843,806 A | 7/1989 | Klinner | |
| 4,951,453 A | 8/1990 | Klinner | |
| 5,044,147 A | 9/1991 | Klinner | |
| 5,111,645 A | 5/1992 | Klinner | |
| 5,389,038 A | 2/1995 | Shelbourne et al. | |
| 5,419,107 A | 5/1995 | Shelbourne et al. | |
| 5,438,818 A | 8/1995 | Shelbourne et al. | |
| 5,557,912 A | 9/1996 | Voss et al. | |
| 9,554,510 B2 | 1/2017 | Nürnberg et al. | |
| 9,788,486 B2 | 10/2017 | Magisson et al. | |
| 2004/0148919 A1 | 8/2004 | Dunn | |
| 2013/0160414 A1 | 6/2013 | Robert et al. | |
| 2017/0006773 A1 | 1/2017 | Stephenson et al. | |
| 2018/0014462 A1 | 1/2018 | Borry et al. | |
| 2020/0029503 A1 * | 1/2020 | Nielsen | A01D 43/102 |
| 2020/0253124 A1 | 8/2020 | Honey et al. | |

FOREIGN PATENT DOCUMENTS

| | | | |
|---|---|---|---|
| DE | 0117584 | A | 1/1976 |
| DE | 0135029 | A | 4/1979 |
| DE | 8524124 | U1 | 10/1985 |
| DE | 3606030 | A1 | 8/1986 |
| DE | 0243201 | A5 | 2/1987 |
| DE | 4324812 | A1 | 1/1995 |
| DE | 4324813 | C1 | 1/1995 |
| DE | 102005025319 | A1 | 12/2006 |
| DE | 102011051981 | A1 | 1/2013 |
| DE | 102013107148 | A1 | 1/2015 |
| DE | 102014014871 | B3 | 3/2016 |
| EP | 0212185 | A1 | 3/1987 |
| EP | 0241276 | A1 | 10/1987 |
| EP | 0432318 | A1 | 6/1991 |
| EP | 0346342 | B1 | 7/1994 |
| EP | 1378159 | A1 | 1/2004 |
| EP | 1483953 | A1 | 12/2004 |
| EP | 3430881 | A1 | 1/2019 |
| EP | 3606030 | A1 | 2/2020 |
| EP | 3395151 | B1 | 7/2020 |
| EP | 3018993 | B1 | 9/2020 |
| EP | 3744168 | A2 | 12/2020 |
| FR | 1371068 | A | 8/1964 |
| FR | 2794608 | A1 | 12/2000 |
| RU | 2744619 | C1 | 3/2021 |
| WO | WO 1988005626 | A1 | 8/1988 |

OTHER PUBLICATIONS

Shelbourne Stripper Header, pp. 1-10, [online]. Retrieved from the Internet <URL: https://www.shelbourne.com/harvest/stripper-header/>.

New Holland Dual Stream Header, Jun. 10, 2015, pp. 1-2, [online]. Retrieved from the Internet <URL: https://nhag.cc.cnh.com/eu/en-uk/about-us/whats-on/news-events/2015/new-holland-launches-dual-stream-header>.

Extended European Search Report and Written Opinion issued in European Patent Application No. 25151386.7 dated May 13, 2025, in 08 pages.

* cited by examiner

HARVESTER IMPLEMENT WITH CONDITIONING IMPELLER HAVING A CHOPPING FUNCTION

CROSS-REFERENCE TO RELATED APPLICATIONS

This application is a Continuation-In-Part of and claims the benefit of U.S. patent application Ser. No. 18/417,355, filed on Jan. 19, 2024, which claims the benefit of German patent application DE102023107613.2, filed on Mar. 27, 2023, the disclosures of which are hereby incorporated by reference.

TECHNICAL FIELD

The disclosure generally relates to a harvesting machine having a cutter for cutting crop material, and an impeller style crop conditioning system.

BACKGROUND

It has been proposed numerous times in the past to operate the cutting unit of a combine harvester, when harvesting relatively long-stalked grains, in a so-called high-cutting mode in which the cutter bar of the cutting unit is guided at a relatively great height above the ground at a short distance below the ears, or to cut the ears from the stalks using a so-called stripper. This avoids the need to process straw through the combine harvester, which consumes a relatively great amount of energy. Those stalks which are not cut off by the cutter bars or which remain standing on the field after the stripping operation are cut off and/or comminuted means of suitable devices, so-called secondary or additional cutting units, and deposited on the field in a windrow (DD 117 584 A, DD 243 201 A, FR 2 794 608 A, DE 10 2005 025 319 A1, DE 10 2014 014 871 B3, U.S. Pat. No. 9,788,486 B2) or so as to be distributed across the entire cutting width of the combine harvester (DD 117 584 A, DD 10 896 A, DD 135 029 A, DD 243 201 A, DE 24 18 995 A1, DE 43 24 812 A, DE 43 24 813 C, DE 85 24 124 U, EP 1 378 159 A, EP 1 483 953 A, FR 1 371 068 A, DE 10 2005 025 319 A1, DE 10 2013 107 148 A1, DE 10 2014 014 871 B3, U.S. Pat. No. 9,788,486 B2).

In the references, the additional cutting units extend over the entire width of the harvesting header, that is to say also under the center of the harvesting header, to the rear side of which the feeder house is coupled. This has the disadvantage that the additional cutting unit must be dimensioned to have a height small enough that it can be located underneath the feeder house. Furthermore, in the case of lodged cereal crops, the harvesting header cannot be lowered further than is allowed by the additional cutting unit, and ultimately only very little non-grain material (in particular straw) passes through the combine harvester. This non-grain material DEE05-41117 however has the effect of lowering the aggressiveness of the threshing and separating devices and thus reducing damage to the grain during the threshing and separating operations.

Harvesting machines that may be coupled to an agricultural machine, and which are used to cut and condition crop material, such as but not limited to hay and forage, are also known. The harvesting machine may be attached to a forward end of the agricultural machine, such as a windrower, which pushes the harvesting machine. In other embodiments, the harvesting machine may be attached to a rearward end of the agricultural machine, such as a tractor, which pulls the harvesting machine. Such harvesting machines may be referred to as a mower conditioner.

The mower conditioner includes the cutter and a crop conditioning system that conditions the cut crop material. As used herein, "crop conditioning" or "conditioned crop material" includes processing the cut crop material to bend, crimp, and/or crack open stem and stalk portions of the cut crop material, and at least partially remove a wax material from the cut crop material, for the purpose of releasing moisture from the cut crop material and reducing dry-down time of the crop material. Once the crop conditioning system has conditioned the cut crop material, a swathboard or discharge hood may at least partially form the crop material into a swath having a desired width and/or depth. The crop conditioning system may include, for example, an impeller style conditioning system including a conveyor rotor having a plurality of tines or drivers pivotably coupled to an exterior surface of the conveyor rotor. The cut crop material passes between a discharge hood and the conveyor rotor, with the drivers abrading the crop material against the discharge hood to crimp and scrape the crop material to condition the crop material and reduce dry-down time.

SUMMARY

A harvesting machine is provided. The harvesting machine includes a frame structure. A cutter is coupled to the frame structure. The cutter is operable to cut standing crop material. A conveyor rotor is rotatably mounted to the frame structure for rotation about a rotor axis. The conveyor includes a plurality of drivers mounted to an exterior surface of the conveyor rotor. A discharge hood is mounted to the frame structure above the conveyor rotor. The conveyor rotor is configured for rotation about the rotor axis in a first rotational direction for moving crop material over the conveyor rotor, between the discharge hood and the conveyor rotor, for conditioning the crop material. The conveyor rotor is configured for rotation about the rotor axis in a second rotational direction, opposite the first rotational direction, for moving the crop material under the conveyor rotor for cutting the crop material.

In one aspect of the disclosure, each of the plurality of drivers includes a first edge that presents a first leading edge when the conveyor rotor rotates about the rotor axis in the first rotational direction, and may further include a second edge that presents a second leading edge when the conveyor rotor rotates about the rotor axis in the second rotational direction. The first edge of each of the plurality of drivers may be formed to define a non-cutting edge, i.e., a dull edge, for conditioning the crop material. The second edge of each of the plurality of drivers may be formed to define a cutting edge, i.e., a knife edge, for cutting the crop material.

In one aspect of the disclosure, each of the plurality of drivers may include a generally planar or straight configuration. However, in other implementations, each of the plurality of drivers may include a "Y" shaped configuration having a base portion mounted to the conveyor rotor, a first branch portion and a second branch portion each extending outward from the base portion to respective distal ends.

In one aspect of the disclosure, the harvesting machine may include a plurality of counterpart blades. Each of the plurality of counterpart blades may be mounted to the frame structure and positioned to cooperate with a respective one of the plurality of drivers for cutting the crop material.

In one implementation, each of the plurality of counterpart blades is mounted proximate a lower half of the conveyor rotor for cooperating with the respective second edge of the respective plurality of drivers when the drivers are rotating in the second rotational direction.

In another implementation, each of the plurality of counterpart blades may be mounted proximate an upper half of the conveyor rotor for cooperating with the respective first edge of the respective plurality of drivers when the drivers are rotating in the first rotational direction. When the plurality of counterpart blades are mounted proximate the upper half of the conveyor rotor, each of the plurality of counterpart blades may moveable relative to the frame structure between a retracted position and a deployed position. When the plurality of counterpart blades are disposed in the retracted position, the plurality of counterpart blades are moved out of the flow of the crop material and disengaged from the plurality of drivers, whereby the plurality of drivers and the discharge hood may cooperate to condition the crop material. When the plurality of counterpart blades are disposed in the deployed position, the plurality of counterpart blades positioned within the flow of the crop material and are engaged with the plurality of drivers for cutting the crop material.

Accordingly, the harvesting machine described herein may be implemented as a mower conditioner implement that is configurable to selectively condition cut crop material, or chop the crop material into smaller pieces for distribution across a wide area.

The above features and advantages and other features and advantages of the present teachings are readily apparent from the following detailed description of the best modes for carrying out the teachings when taken in connection with the accompanying drawings.

DETAILED DESCRIPTION

Figure 1:
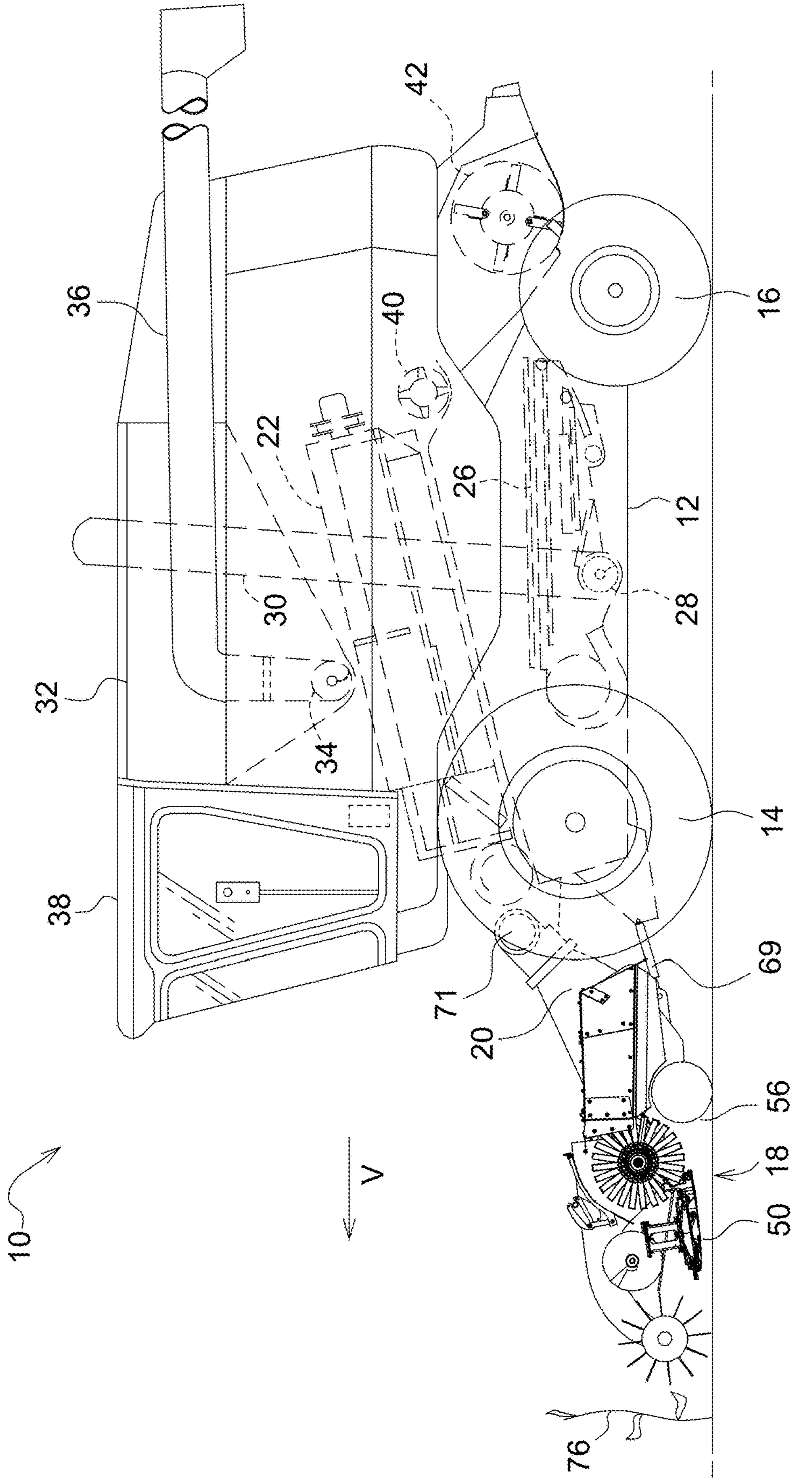
FIG. 1 shows a schematic side view of a combine harvester having a harvesting header for harvesting the upper parts of the plants, which harvesting header is equipped with an additional cutting unit for the stalks.

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions.

The terms "forward", "rearward", "left", and "right", when used in connection with a moveable implement and/or components thereof are usually determined with reference to the direction of travel during operation, but should not be construed as limiting. The terms "longitudinal" and "transverse" are usually determined with reference to the fore-and-aft direction of the implement relative to the direction of travel during operation, and should also not be construed as limiting.

Terms of degree, such as "generally", "substantially" or "approximately" are understood by those of ordinary skill to refer to reasonable ranges outside of a given value or orientation, for example, general tolerances or positional relationships associated with manufacturing, assembly, and use of the described embodiments.

As used herein, "e.g." is utilized to non-exhaustively list examples, and carries the same meaning as alternative illustrative phrases such as "including," "including, but not limited to," and "including without limitation." As used herein, unless otherwise limited or modified, lists with elements that are separated by conjunctive terms (e.g., "and") and that are also preceded by the phrase "one or more of," "at least one of," "at least," or a like phrase, indicate configurations or arrangements that potentially include individual elements of the list, or any combination thereof. For example, "at least one of A, B, and C" and "one or more of A, B, and C" each indicate the possibility of only A, only B, only C, or any combination of two or more of A, B, and C (A and B; A and C; B and C; or A, B, and C). As used herein, the singular forms "a", "an" and "the" are intended to include the plural forms as well, unless the context clearly indicates otherwise. Further, "comprises," "includes," and like phrases are intended to specify the presence of stated features, steps, operations, elements, and/or components, but do not preclude the presence or addition of one or more other features, steps, operations, elements, components, and/or groups thereof.

For the purposes of promoting an understanding of the principles of the novel disclosure, reference will now be made to the implementations described herein and illustrated in the drawings and specific language will be used to describe the same. It will nevertheless be understood that no limitation of the scope of the novel disclosure is thereby intended, such alterations and further modifications in the illustrated devices and methods, and such further applications of the principles of the novel disclosure as illustrated therein being contemplated as would normally occur to one skilled in the art to which the novel disclosure relates.

FIG. 1 shows a self-propelled harvesting machine in the form of a combine harvester 10, having a chassis 12 which is supported on the ground via driven front wheels 14 and steerable rear wheels 16 and which is moved by said wheels. The wheels 14, 16 are set in rotation by drive means (not shown) in order to move the combine harvester 10, for example, over a field that is to be harvested. It should be appreciated that the teachings of this disclosure may apply to other configurations of the harvesting machine other than the example implementation of the combine harvester 10. For example, referring to FIG. 10, the harvesting machine is shown configured as a mower-conditioner 110. In the following text, direction indications, such as front and rear, relate to the direction of travel V, running to the left in FIG. 1, of the combine harvester 10 in harvesting operation.

At the front end region of the combine harvester 10, a harvesting header 18 is removably attached to a feeder house 20 in order, during harvesting operation, to harvest the ears or grains of crops 76 in the form of cereals or other threshable straw crops from the field and feed these upward and rearward through the feeder house 20 (which is pivotable about the axis of rotation of an upper diverting roller 71 of the feeder house 20, and thus height-adjustable, by means of a cylinder 69) to an axial threshing unit 22. The mixture passing through threshing concaves and gratings in the axial threshing unit 22 and containing grains and contaminants passes into a cleaning device 26. Cereal cleaned by the cleaning device 26 is fed by means of a grain screw 28 to a grain elevator 30, which conveys said cereal into a grain tank 32. The cleaned cereal from the grain tank 32 can be discharged through a discharge system having a transverse screw 34 and having a discharge conveyor designed as a screw conveyor assembly 36. The crop residues output by the axial threshing unit 22 are fed by means of a conveyor drum 40 to a straw chopper 42, which comminutes said crop residues and spreads them over the field over the width of the cutting unit 18. The abovementioned systems are driven by means of a combustion engine and are monitored and controlled by an operator from a driver's cab 38. The illustrated axial threshing unit 22 having one or more axial threshing and separating rotors is just one exemplary implementation, and could be substituted for example by a tangential threshing unit of one or more threshing drums and downstream straw walkers or separating rotor(s).

Figure 2:
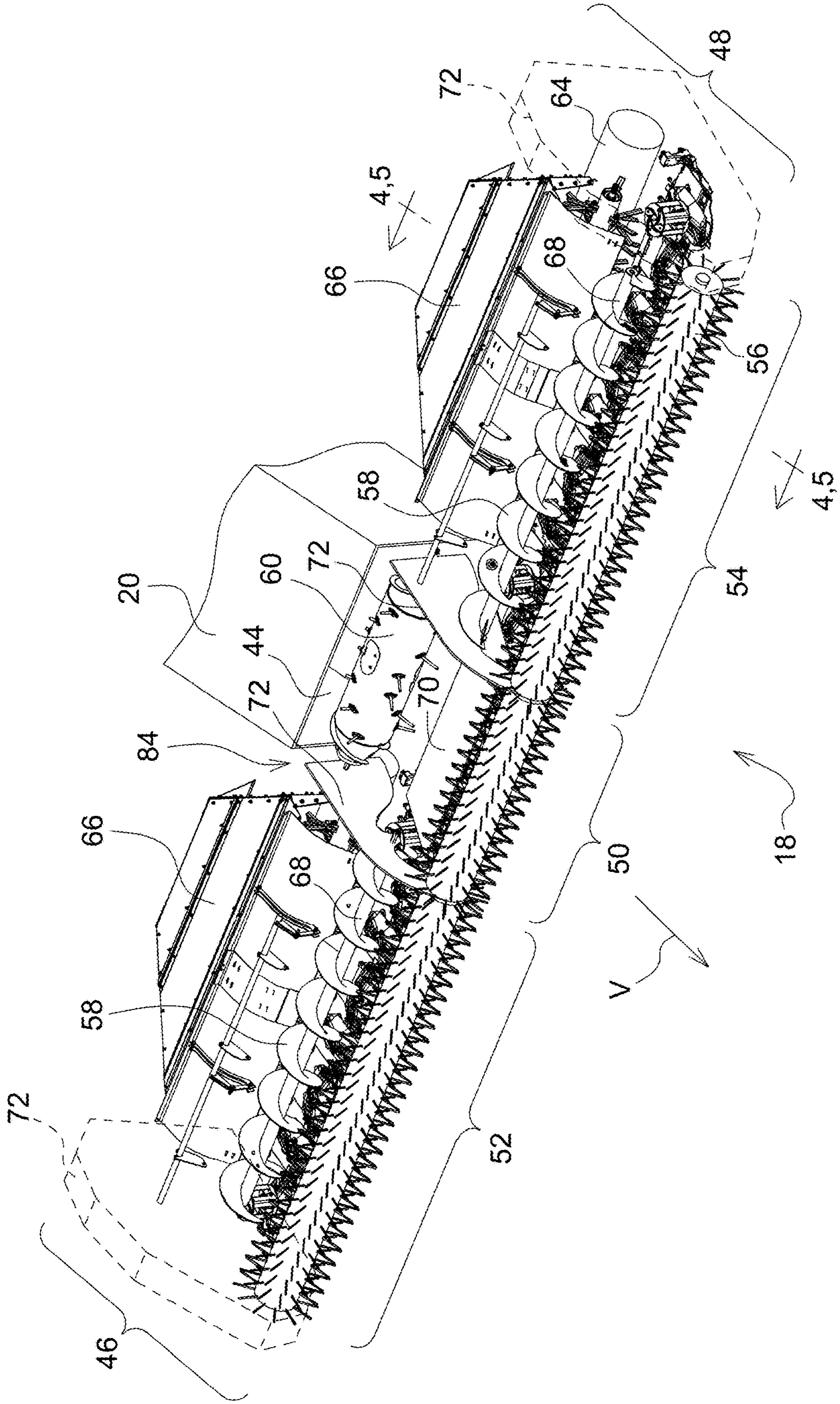
FIG. 2 shows a perspective view of the harvesting header from FIG. 1 from the front and above.
Figure 3:
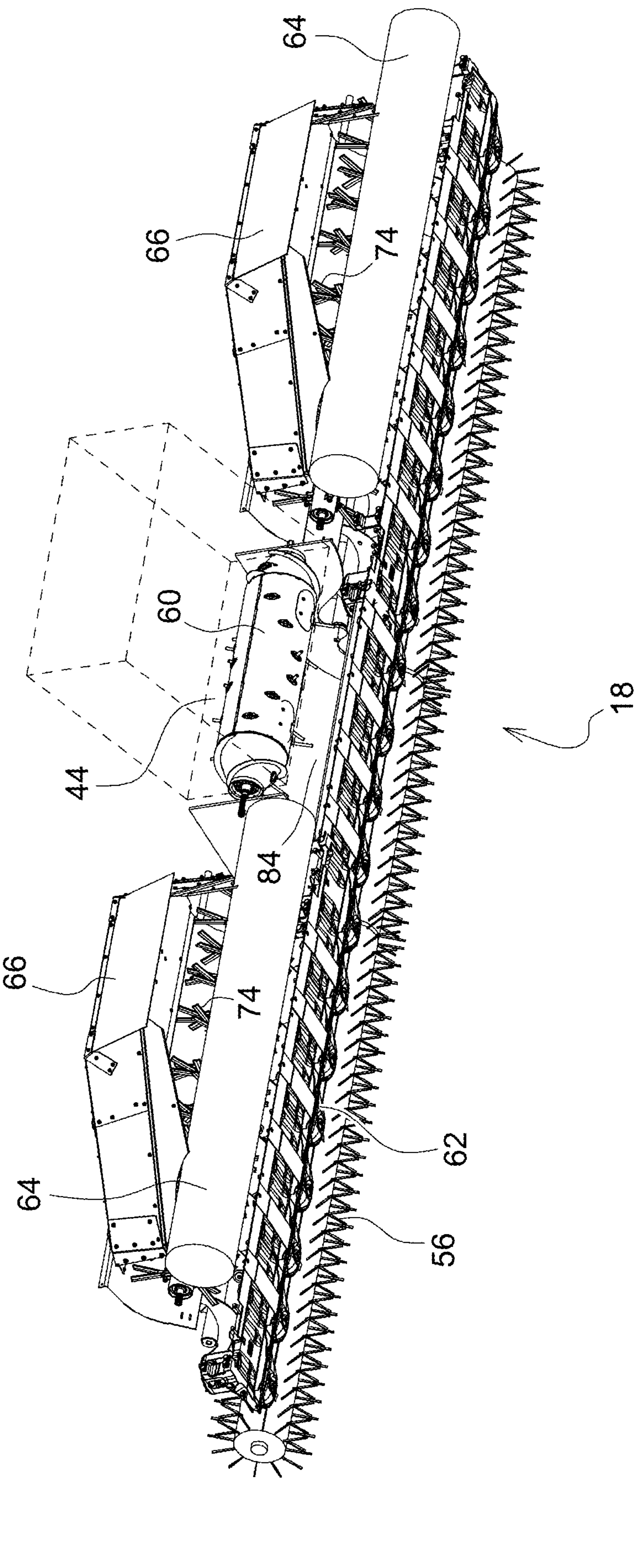
FIG. 3 shows a perspective view of the harvesting header from FIG. 1 from the rear and below.

The harvesting header 18 is shown in FIGS. 2 and 3 in a perspective view from front left and above, and from rear left and below, respectively. The harvesting header 18 comprises a frame structure 44, to which a first region which serves as a harvesting device 46 for harvesting the grains of the crop 76 is attached at the front and top side, whilst a second, rear and bottom region is provided as an additional cutting unit 48 for processing the stalks. The harvesting header 18 is divided in a lateral direction into a central portion 50 and a right-hand portion 52 and a left-hand portion 54 in relation to the forward direction V. To the rear of the central portion 50, the harvesting header 18 is removably attached to the feeder house 20. The width of the central portion 50 at least approximately corresponds to the width of the feeder house 20.

Figure 5:
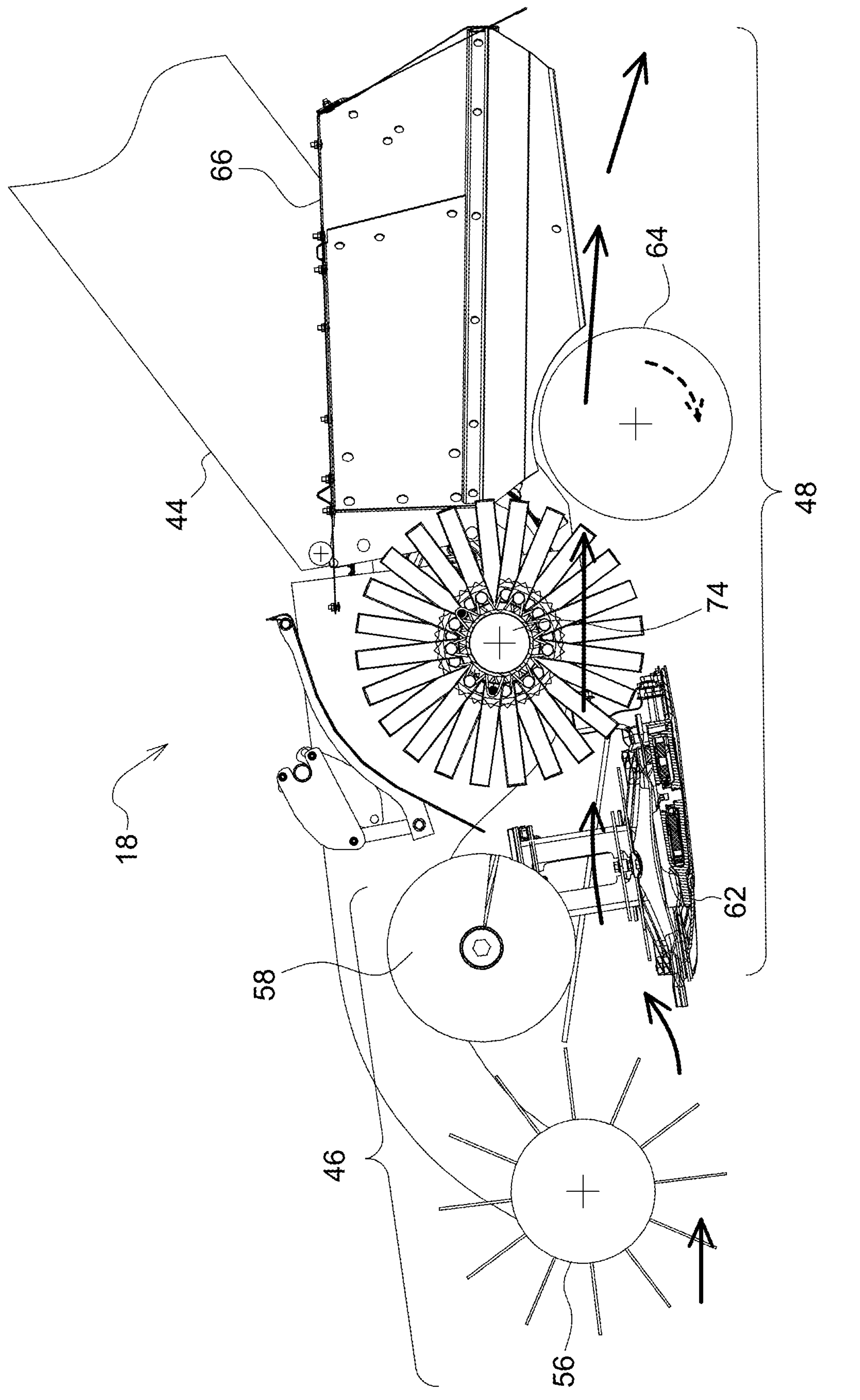
FIG. 5 shows a vertical section through the harvesting header along the line 5-5 in FIG. 2 during chopping operation.
Figure 6:
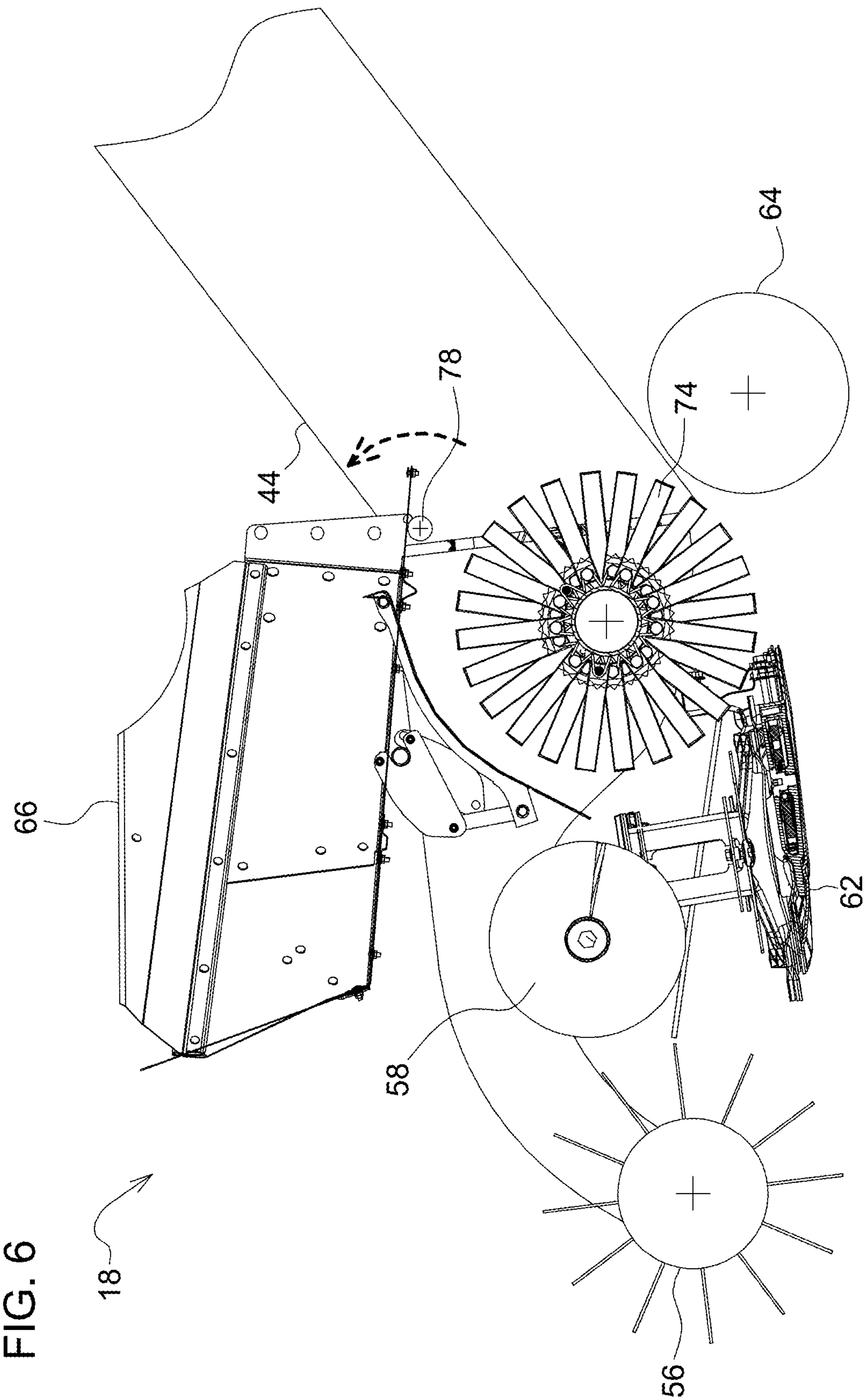
FIG. 6 shows a section corresponding to FIG. 4 or 5 with a windrow-forming plate having been pivoted up for the purposes of on-road transport.
Figure 7:
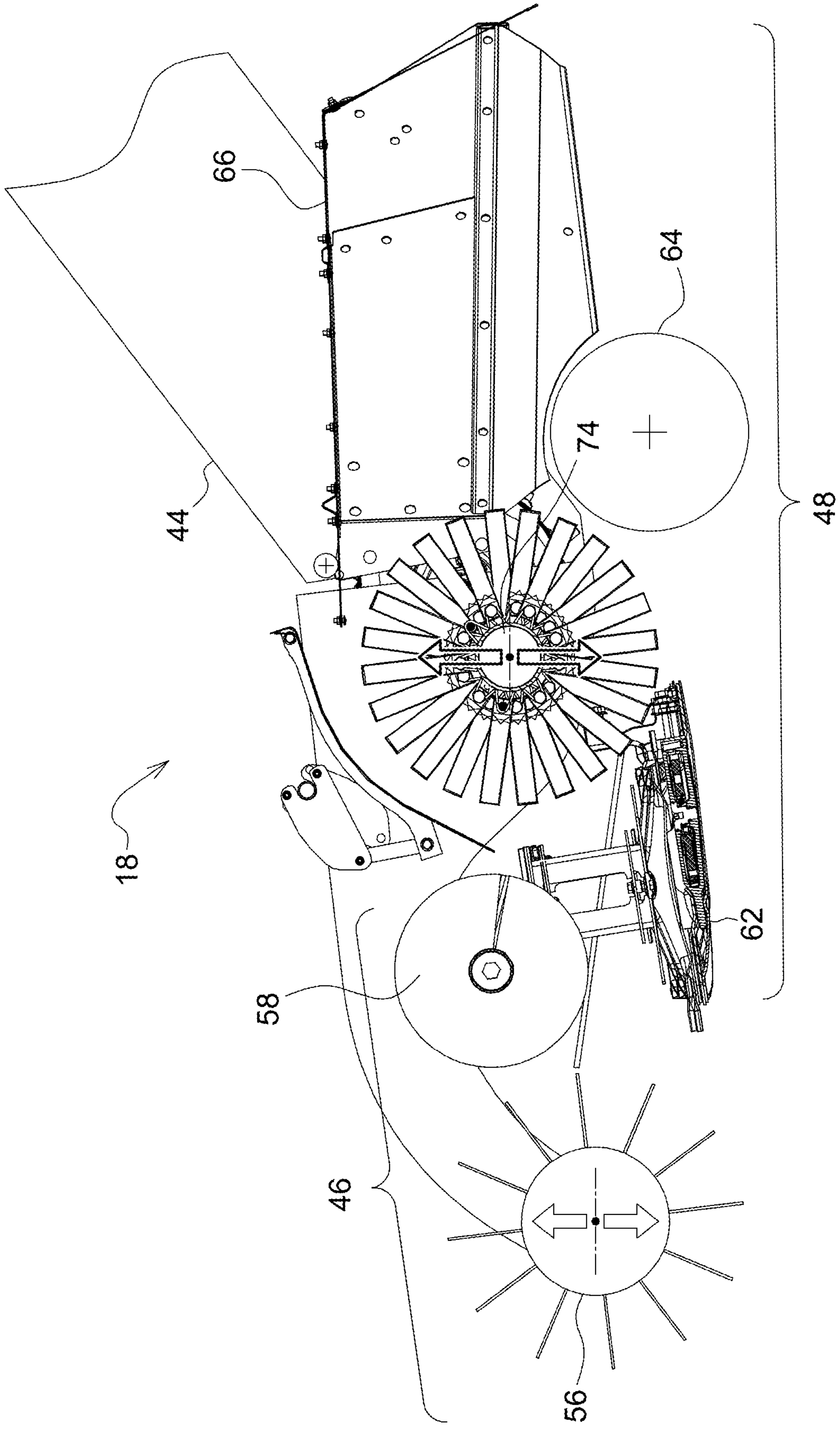
FIG. 7 shows a section corresponding to FIG. 4 or 5 through a second implementation of the additional cutting unit.

The harvesting device 46 of the harvesting header 18 comprises a so-called stripper 56 which, in the implementation illustrated in FIGS. 2 to 8, extends over the entire width of the harvesting header 18. In a manner known per se (see EP 0 241 276 A1 or EP 0 432 318 A1), the stripper 56 separates the ears from the crop 76 by pulling them from the stalks by means of a rotor, which is set in rotation, and stripping means attached to said rotor. In the left-hand and right-hand portions 52, 54 (but not in the central portion 50), transverse conveyor devices 58 are arranged to the rear of the stripper 56 and transport the stripped-off ears to the central portion 50. In FIGS. 2 to 8, the transverse conveyor devices 58 are designed as transverse conveyor screws with troughs 68 arranged under them, although in another implementation they could also be implemented as conveyor belts. In the central portion 50, the transverse conveyor devices 68 discharge the ears onto a lower base 70, onto which the ears that are separated from the crop 76 by the stripper 56 in the central portion 50 also fall. A rear, upper conveyor 60 conveys the ears in an undershot movement from the base 70 of the central portion 50 through a rear dispensing opening 84 of the harvesting header 18 into the feeder house 20. The transverse conveyor devices 68 and the stripper 56 are supported on the frame structure 44 by holding arms 72, which are pivotable about the transverse axis relative to the frame structure 44, and/or are adjustable in length along the longitudinal axis of the holding arms 72, by means of actuators (not shown). In this way, the position of the stripper 56 and of the transverse conveyor devices 68 can be adapted in a horizontal and/or vertical direction to the height of the crop 68, as indicated in FIG. 7, and can for example be lowered in order to take in lodged cereal crops, either by the operator of the combine harvester 10 or automatically, analogously to an adjustment, known per se, of a reel and of a cutter bar of a cutting unit, cf. EP 3 430 881 A1.

The base 70 may be fastened passively, that is to say rigidly and immovably, to the frame structure 44, as shown in the figures, or may be designed as a driven conveyor belt or any other type of conveyor that conveys the crop rearward in an overshot movement to the rear dispensing opening 84.

As shown in FIGS. 2 and 3, the additional cutting unit 48 comprises a cutter 62 (the central part of which functionally belongs to the harvesting device 46) which extends over the entire width of the harvesting header 18, conveyor rotors 74 which are arranged in each case only in the left-hand and right-hand portions 52, 54 of the harvesting header 18 and which extend transversely with respect to the forward direction V, chopping rotors 64 which extend transversely with respect to the forward direction V, and discharge hoods 66 arranged at the rear. The cutter 62 is coupled to an supported by the frame structure 44. As stated above, by means of the additional cutting unit 48, the stalks that remain in the ground after the ears have been stripped from the crop 76 are cut from the ground by means of the cutter 62 and are either deposited in one or more windrows on the field or are chopped and deposited on the field.

The conveyor rotors 74, chopping rotors 64 and discharge hoods 66 are arranged only in the left-hand and right-hand portions 52, 54 of the harvesting header 18, not in the central portion 50. The stalks of the crop that stand in the central portion 50 are thus cut off by the central region of the cutter 62 (which is functionally part of the harvesting device 46) that is arranged there, and said stalks pass directly onto the base 70, onto which the ears of the crop 76 that enter over the entire width of the harvesting header 18 are also transferred. The stalks that enter in the central portion 50 thus pass through the feeder house 20 and the combine harvester 10, and at the rear end thereof, in a windrowing mode, are led past the straw chopper 42 and are deposited as a windrow on the field, or in a chopping mode, are led through the straw chopper 42 and are spread in the form of chopped material (preferably only) over the width of the central portion 50 of the harvesting header 18 by means of spreading devices (not shown in FIG. 1) situated downstream of said straw chopper, which spreading devices may also be omitted or moved into an inactive position, in particular if the width of the straw chopper 42 approximately corresponds to the width of the central portion 50.

Figure 4:
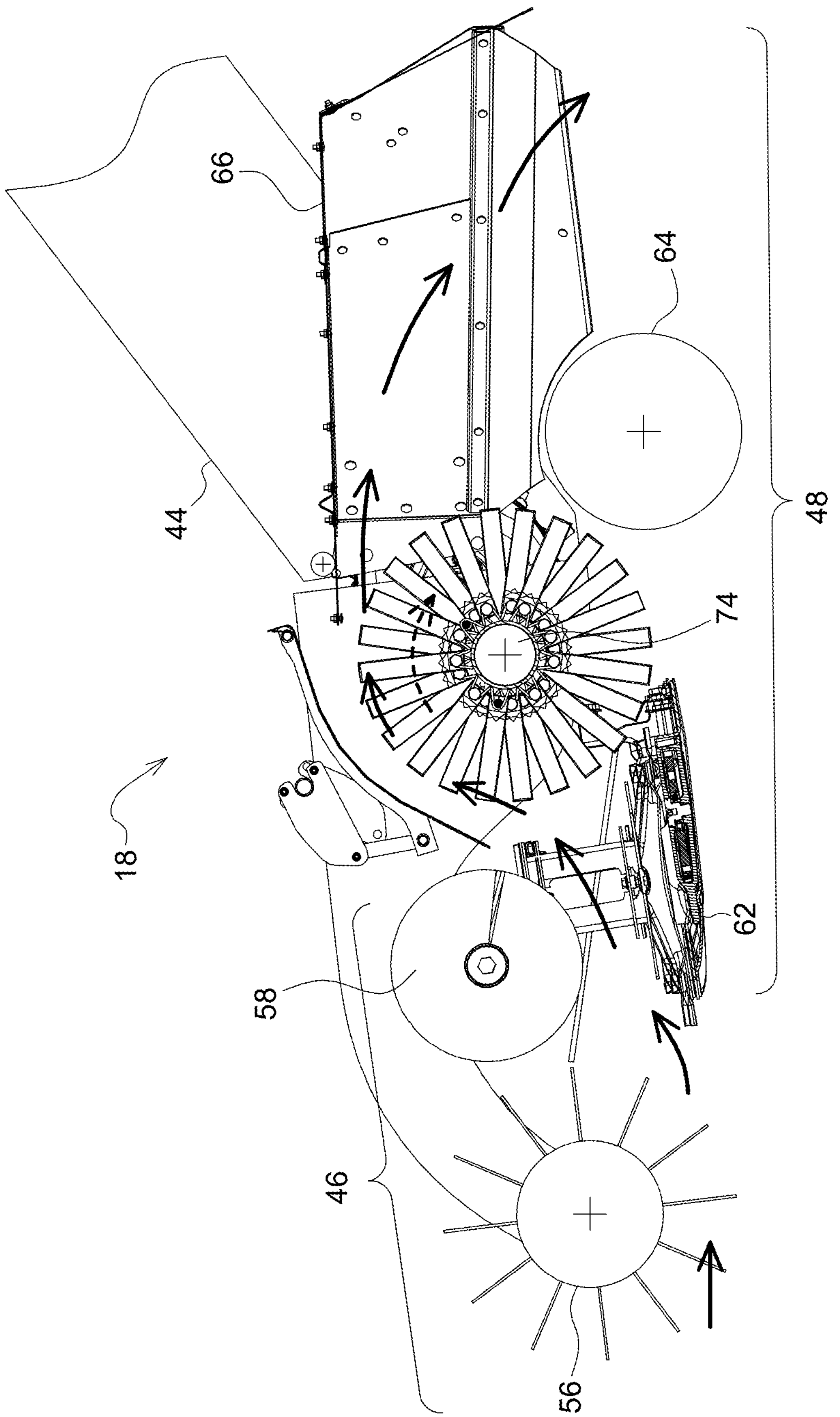
FIG. 4 shows a vertical section through the harvesting header along the line 4-4 in FIG. 2.

FIG. 4 shows the additional cutting unit 48 in a windrowing mode. The cutter 62, which is designed as a disk-type cutter 62, cuts the stalks of the crop 76 from the ground. The stalks that are cut off in the left-hand and right-hand portions 52, 54 are picked up by the conveyor rotor 74 arranged there and are conveyed in an overshot movement and flung against the discharge hood 66, which brings the chopped material together laterally and deposits it in a windrow. These windrows may be deposited on the field centrally in each case in the left-hand and right-hand portions 52, 54, or are guided to the center of the harvesting header 18 and are deposited there underneath the feeder house 20. Both cases avoid a situation in which the wheels 14, 16 of the combine harvester 10 travel over the windrow. If three windrows are deposited behind the working width of the harvesting header, these may be collected successively, or they are picked up in a single working operation by a baler or a forage harvester with a sufficiently wide pickup, or they are firstly merged to form a single windrow.

In a further implementation that is not shown, the discharge hoods 66 may be replaced by transverse conveyor belts which convey the stalks in a transverse direction and deposit them at one of the locations mentioned in the previous paragraph.

FIG. 5 shows the additional cutting unit 48 in a chopping mode. The cutter 62, which may also be designed in the form of cutter bars such as are conventional in cutting units, cuts the stalks of the crop 76 from the ground. The stalks that are cut off in the left-hand and righthand portions 52, 54 are picked up by the conveyor rotor 74 arranged there and are conveyed in an undershot movement and fed to the chopping rotor 64, which comminutes said stalks and deposits them on the field in a manner spread over the width of the left-hand and right-hand portions 52, 54. The chopping rotors 64 may be designed, in a manner known per se, as flail choppers, cf. DE 10 2011 051 981 A1.

As shown in FIG. 6, the discharge hoods 66 may be articulated at their front, upper ends on the frame structure 44 so as to be pivotable about a pivot axis 78 extending horizontally and transversely with respect to the forward direction V, in order that said discharge hoods can be moved into the non-operational position above the harvesting header 18 as shown in FIG. 7, in which position the harvesting header 18 can be dismounted from the feeder house 20 and placed onto a cutting unit transport vehicle and towed behind the combine harvester 10 for the purposes of being transported on a road. The discharge hoods 66 may be pivoted manually by an operator, or by means of an actuator (not shown).

FIG. 7 illustrates an implementation in which the conveyor rotors 74 have, for chopping operation, been moved into a raised position in which their drive can be deactivated. For windrowing operation, the conveyor rotors 74 are lowered, and their drive is activated. The adjustment between the operational and non-operational positions may be performed manually by the operator, or by means of an actuator.

Figure 8:
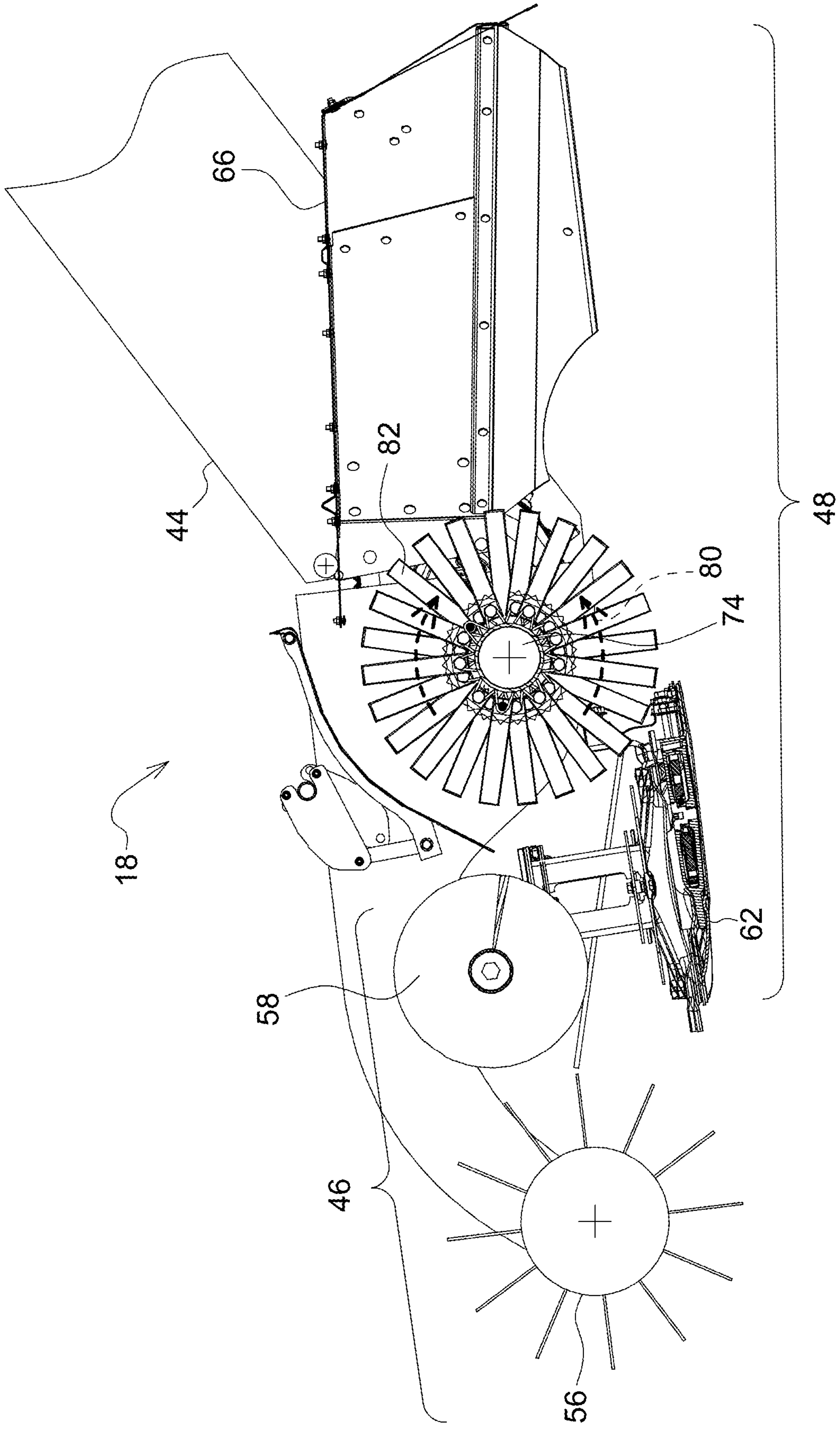
FIG. 8 shows a section corresponding to FIG. 4 or 5 through a third implementation of the additional cutting unit.

In the implementation in FIG. 8, the chopping rotors 64 been omitted, and their function is performed by the conveyor rotors 74 which, during chopping operation, analogously to FIG. 5, operate in an undershot configuration and interact with counterpart blades 80 which protrude in each case between the rows of drivers 82 that are distributed over the conveyor rotors 74 in an axial and circumferential direction. Here, the leading flanks of the drivers 82 during chopping operation, and/or the front surfaces, interacting with said flanks, of the counterpart blades 80, may be sharpened.

Figure 9:
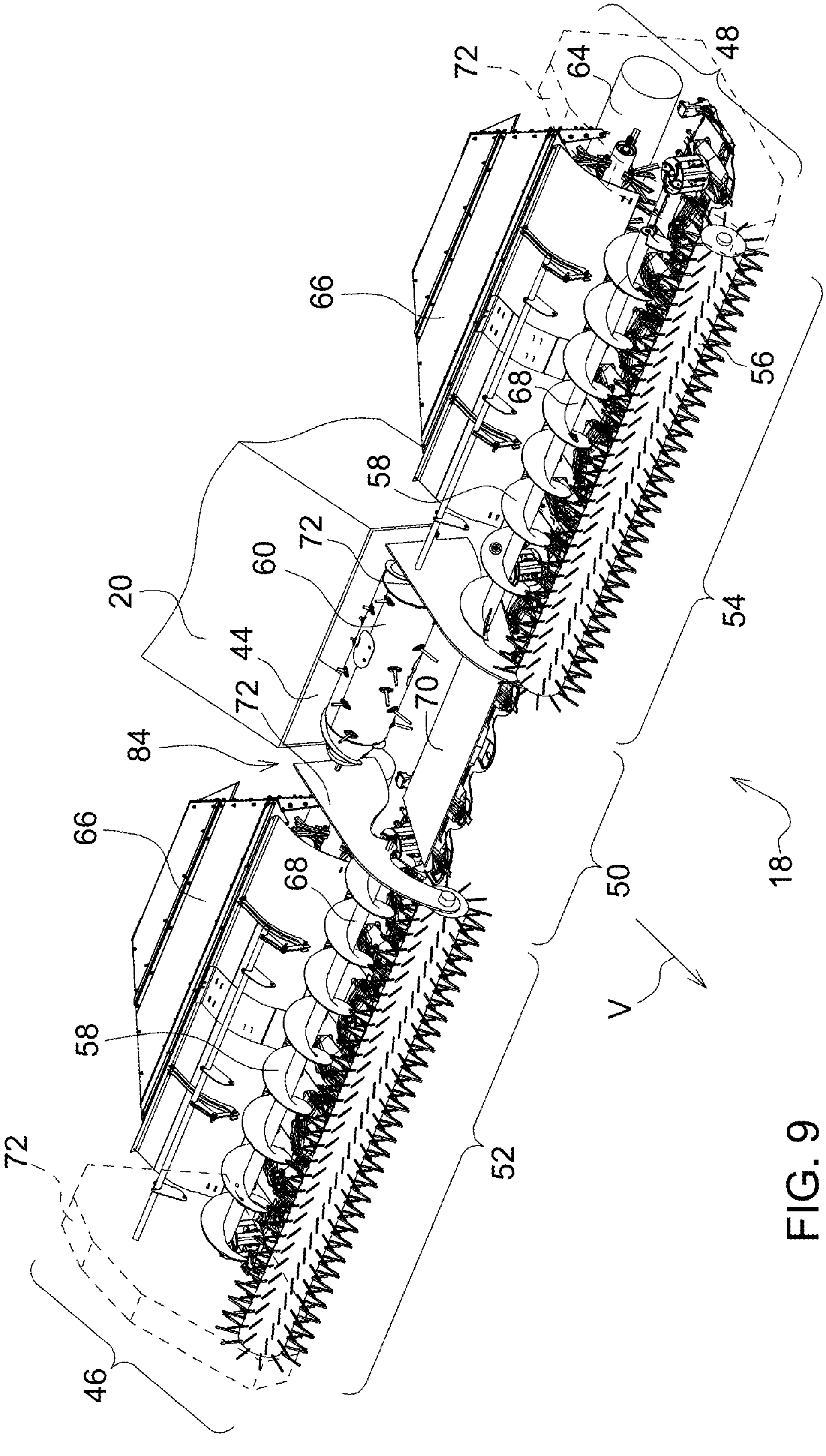
FIG. 9 shows a perspective view of a further implementation of the harvesting header.

Since crops 76 entering the central portion 50 are cut off by that part of the cutter 62 which is arranged there, it is in principle not necessary for a stripper 56 to be provided in the central portion 50 of the harvesting header 18. In the implementation of FIG. 9, the stripper 56 has thus been omitted in the central portion 50.

It is also to be noted that the drive of the stripper 56, of the transverse conveyor devices 68, of the cutter 62 and of the conveyor rotors 74 and chopping rotors 64 may be derived from the feeder house 20 via mechanical drivetrains, in a manner known per se. When, for example, the chopping rotors 64 are not in use in the windrowing mode of FIG. 4, or when the conveyor rotors 74 have been moved into an inactive raised position in the chopping mode as per FIG. 7, the relevant drivetrain may be disconnected by means of a clutch. Alternatively, one or more of said elements (stripper 56, transverse conveyor devices 68, cutter 62, conveyor rotors 74, chopping rotors 64) may be assigned an electrically or hydraulically operated motor.

Furthermore, the strippers 56 could be substituted by conventional cutter bars, operating in a high-cutting mode, and reels (see for example DE 10 2005 025 319 A1). Analogously to FIGS. 2 and 9, the cutter bar and the reels may be present (as in FIG. 2) or omitted (as in FIG. 9) in the central portion.

The fact that the stalks of the crop 76 entering the central portion 50 are also taken into the feeder house 20 and thus into the combine harvester 10 consequently clearly has numerous advantages. This prevents the threshing and separating devices of the axial threshing unit 22 (or of a tangential threshing unit with downstream separating rotors or straw walkers) from exerting too aggressive an action on the grains of the crop, because it is ensured that a certain proportion of stalks (straw) is conveyed with said grains, which can make the action of the threshing and separating device less aggressive to a certain extent. The need to provide the additional cutting unit 48 underneath the feeder house 20 is also eliminated, which improves the design possibilities for the additional cutting unit 48, and the feeder house 20 can also be lowered to a relatively great extent, thus allowing a stripper 56 to be used to pick up even lodged cereal crops.

As noted above, the harvesting machine may be configured differently than the example implementation of the combine harvester 10 described above. For example, referring to FIG. 10, a harvesting machine incorporating the teachings of this disclosure is shown embodied as a mower conditioner 110.

As described above with reference to the combine harvester 10, the mower conditioner 110 includes a frame structure 44 configured to support the various components of the mower conditioner 110. The mower conditioner 110 includes the cutter 62 coupled to the frame structure 44 and operable to cut standing crop material. The conveyor rotor 74 is rotatable about a rotor axis 112. The plurality of drivers 82 are mounted to an exterior surface 114 of the conveyor rotor 74. The drivers 82 may be pivotably mounted to the conveyor rotor 74 so as to extend radially outward due to centrifugal forces during rotation, yet be able to pivot relative to the conveyor rotor 74 in response to contacting an object. The discharge hood 66 is mounted to the frame structure 44 above the conveyor rotor 74.

Figure 10:
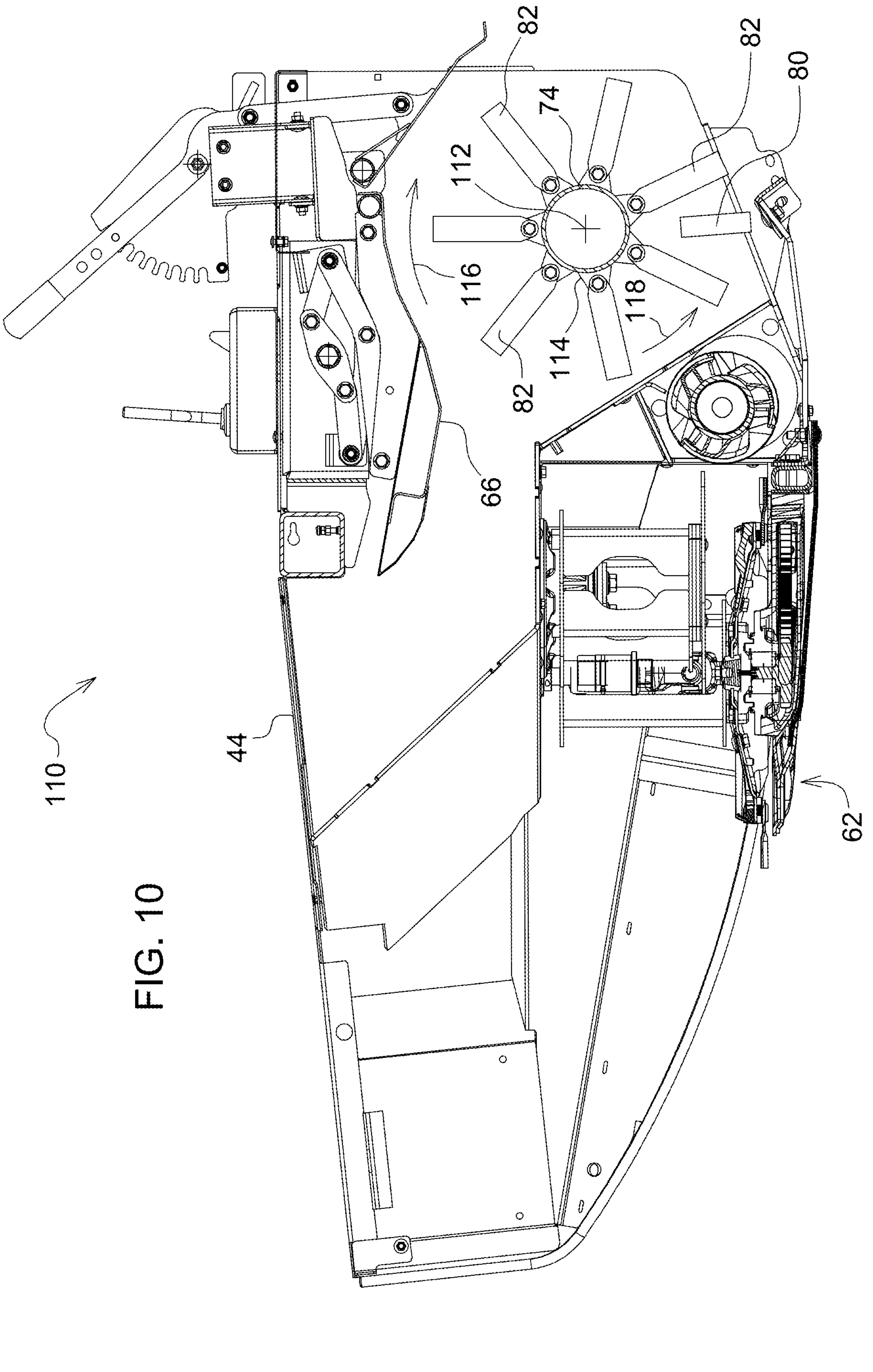
FIG. 10 shows a cross sectional side view of a first implementation of a mower conditioner.

Referring to FIG. 10, and as described above with reference to the combine harvester 10, the conveyor rotor 74 is configured for rotation about the rotor axis 112 in a first rotational direction 116 for moving crop material over the conveyor rotor 74 in an overshot movement, between the discharge hood 66 and the conveyor rotor 74, for conditioning the crop material. Additionally, the conveyor rotor 74 is configured for rotation about the rotor axis 112 in a second rotational direction 118, opposite the first rotational direction 116, in an undershot movement for moving the crop material under the conveyor rotor 74 for cutting the crop material into smaller pieces.

It should be appreciated and understood by those skilled in the art that conditioning crop material does not include chopping or cutting the crop material into smaller pieces. Rather, conditioning the crop material generally includes crimping and/or cracking open stem and stalk portions of the cut crop material, and at least partially removing an exterior wax material from the cut stems and stalks of the crop material, for the purpose of releasing moisture from the cut crop material and reducing dry-down time of the crop material. As such, it should be appreciated that conditioning the crop material is a different process then cutting or chopping the crop material, which is performed to cut the stems and stalk portions of the crop material into smaller pieces, i.e., reduce the length of the stems and stalks of the crop material.

Figure 11:
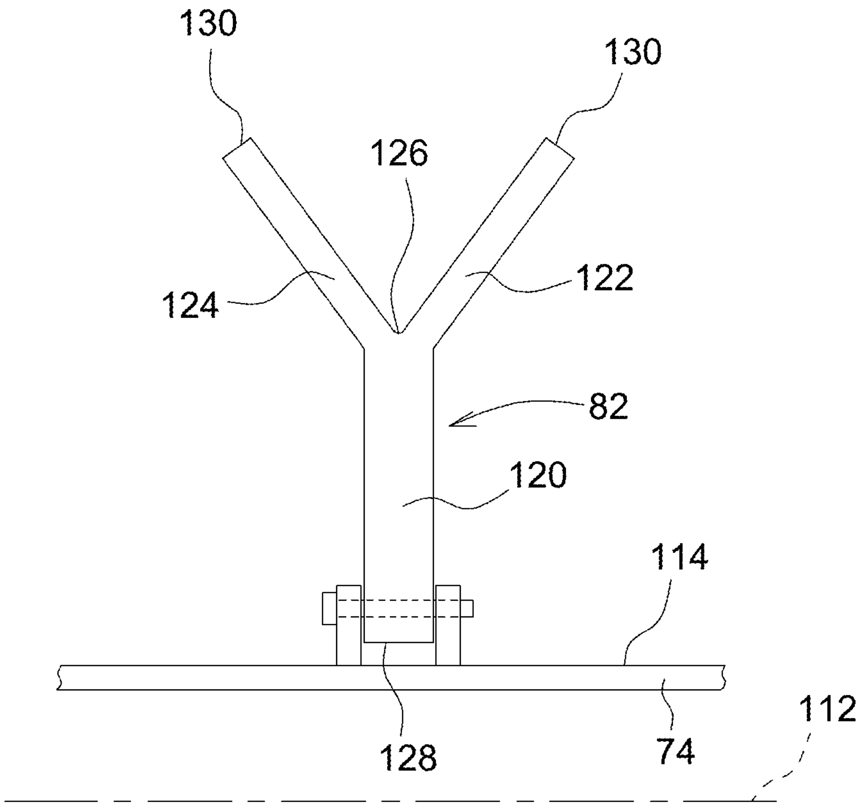
FIG. 11 shows a front view of a first implementation of a driver of the mower conditioner configured to include a "Y" shape.

In one aspect of the disclosure, referring to FIG. 11, each of the plurality of drivers 82 may include a generally "Y" shaped configuration having a base portion 120 mounted to the conveyor rotor 74, a first branch portion 122 and a second branch portion 124 each extending outward from a junction 126 with the base portion 120 to respective distal ends. However, in other implementations, with reference to FIGS. 12 and 13, each of the plurality of drivers 82 may include a generally straight, planar or plate like configuration, having a first end 128 rotatably mounted to the conveyor rotor 74, and extending linearly outwardly to a distal second end 130.

Figure 12:
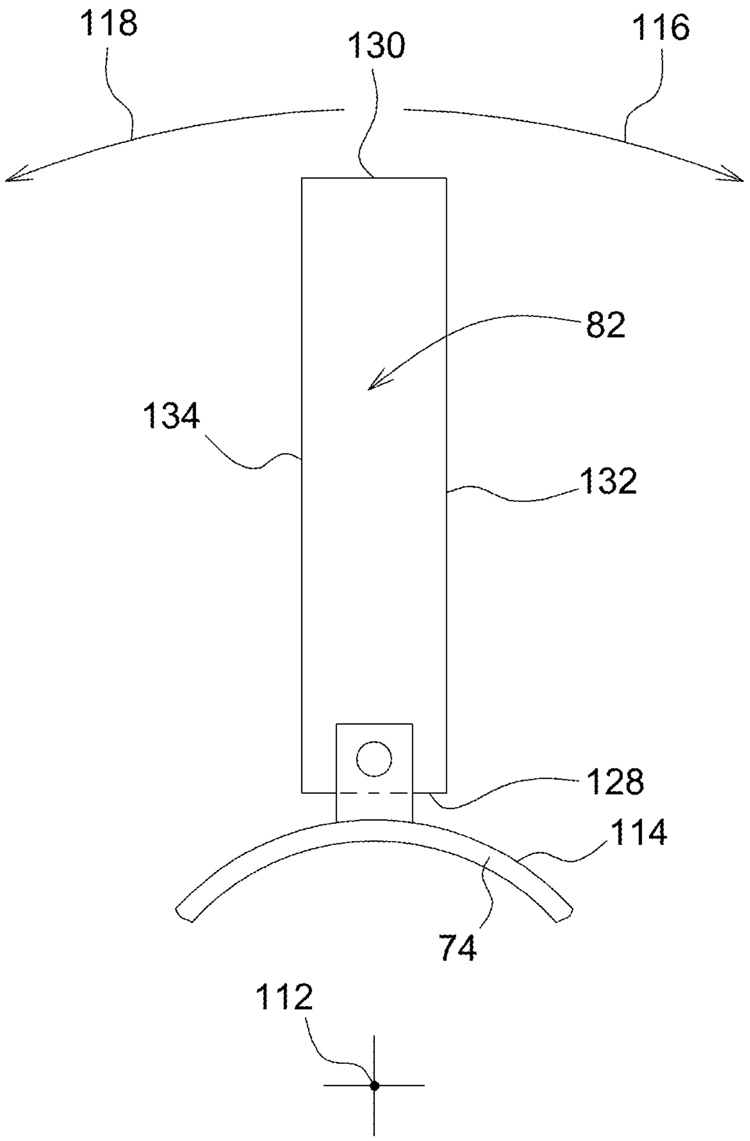
FIG. 12 shows a side profile of an alternative embodiment of the driver configured to include a straight planar shape.

Referring to FIG. 12, each of the plurality of drivers 82 includes a first edge 132 that presents a first leading edge when the conveyor rotor 74 rotates about the rotor axis 112 in the first rotational direction 116, and further includes a second edge 134 that presents a second leading edge when the conveyor rotor 74 rotates about the rotor axis 112 in the second rotational direction 118.

Figure 13:
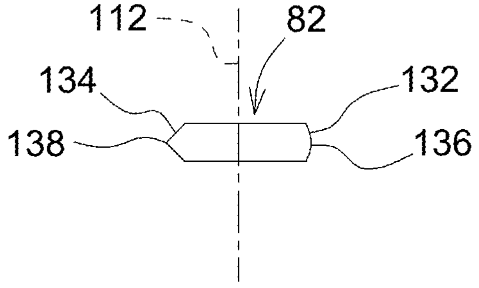
FIG. 13 shows a top view of the driver shown in FIG. 12.

Referring to FIG. 13, in one implementation, the first edge 132 of each of the plurality of drivers 82 may be formed to define a non-cutting edge 136, e.g., a dull edge, for conditioning the crop material. As described above, crop conditioning does not include cutting or chopping the crop material. As such, a sharp edge is not desirable for crop conditioning. However, crop conditioning does include scraping of the wax material from the exterior of the stems and stalks, for which a dull edge, i.e., a non-cutting edge 136, is desirable. The second edge 134 of each of the plurality of drivers 82 may be formed to define a cutting edge 138, i.e., a sharp edge or a knife edge, for cutting the crop material. This configuration enables the drivers 82 to be used for both crop conditioning during rotation in the first rotational direction 116, in which the first edge 132 defines the leading edge of the driver 82 during rotation, and also for crop cutting/chopping during rotation in the second rotational direction 118, in which the second edge 134 defines the leading edge of the driver 82 during rotation.

When the drivers 82 are implemented and configured to include a straight, planar shape, such as shown in FIGS. 8, 10 and 14-15, then the mower conditioner 110 may include a plurality of counterpart blades 80, such as described with reference to the combine harvester 10. Each of the plurality of counterpart blades 80 is mounted to the frame structure 44 and is positioned to cooperate with a respective one of the plurality of drivers 82 for cutting the crop material. Each of the plurality of counterpart blades 80 is positioned relative to a respective one of the drivers 82 to define a shearing and/or cutting action therebetween as the drivers 82 rotate past their respective counterpart blade 80. As described above with reference to the combine harvester, each of the counterpart blades 80 may include a sharpened or knife edge for cutting the crop material.

As shown in FIGS. 8 and 10 and as described above with reference to the combine harvester 10, each of the plurality of counterpart blades 80 may be mounted proximate a lower half of the conveyor rotor 74. When positioned proximate the lower half of the conveyor rotor 74, the counterpart blades 80 are positioned to engage the second edge 134 of the drivers 82 in cutting/shearing action when the drivers 82 are rotated about the rotor axis 112 in the second rotational direction 118, in which the crop material is moved underneath the conveyor rotor 74.

Figure 14:
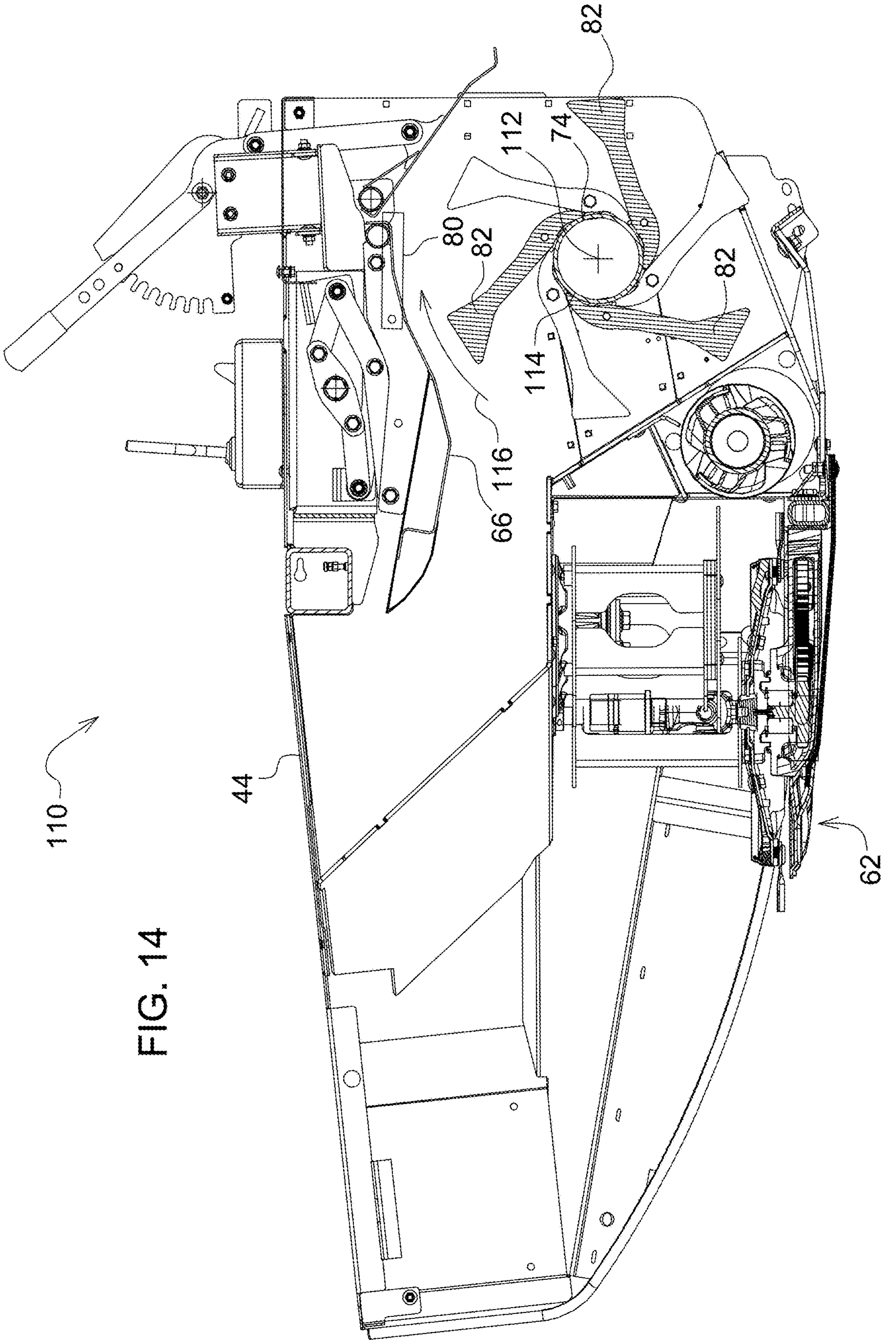
FIG. 14 shows an alternative embodiment of the mower conditioner showing a driver of a conveyor rotor disposed in a retracted position.
Figure 15:
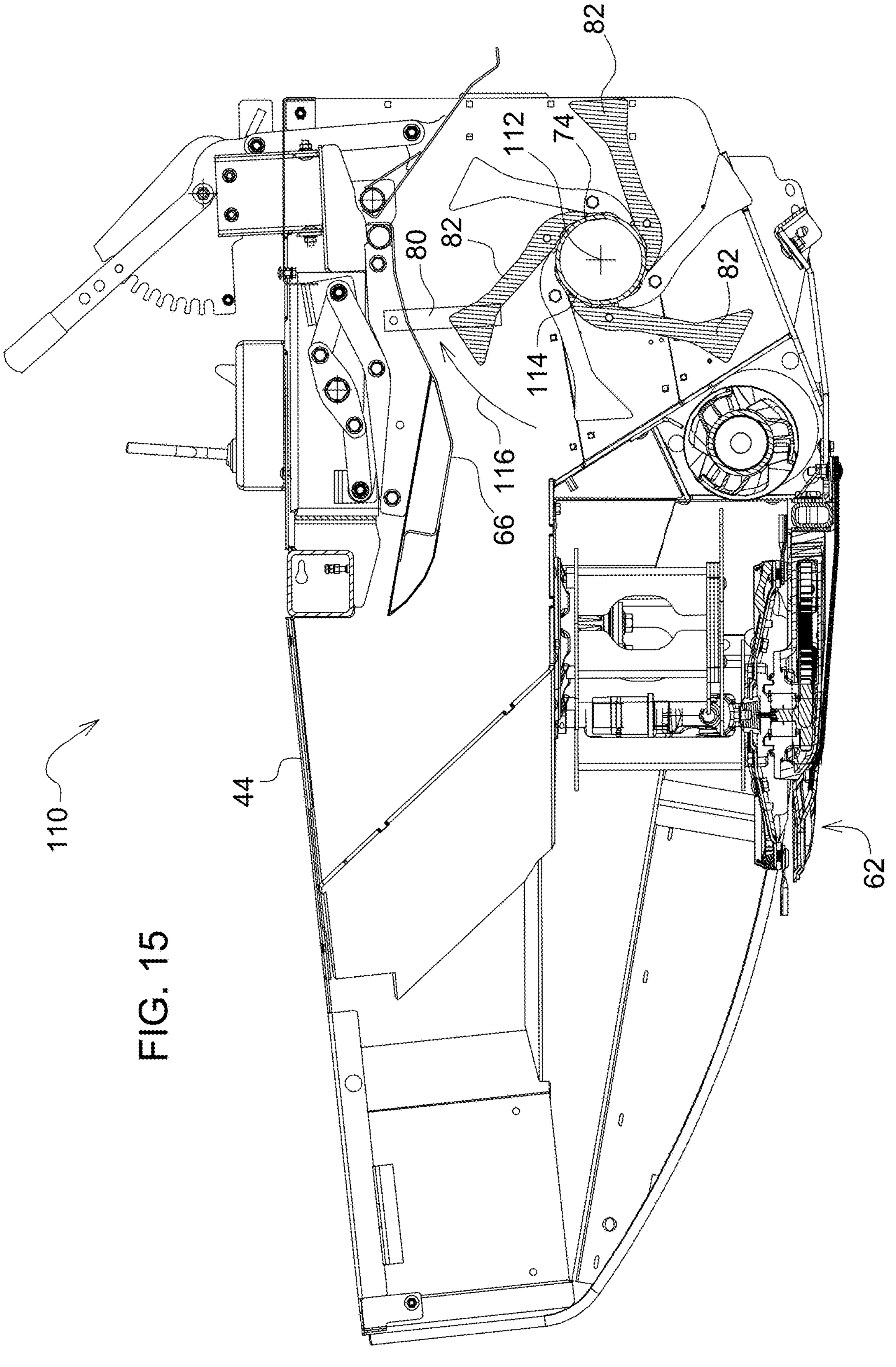
FIG. 15 shows the alternative embodiment of the mower conditioner of FIG. 14 with the driver disposed in a deployed position.

In an alternative implementation, referring to FIGS. 14 and 15, each of the plurality of counterpart blades 80 may be mounted proximate an upper half of the conveyor rotor 74, generally between the discharge hood 66 and the conveyor rotor 74. In this configuration, each of the plurality of counterpart blades 80 may be moveable relative to the frame structure 44 between a retracted position, shown in FIG. 14, and a deployed position, shown in FIG. 15. When the plurality of counterpart blades 80 are disposed in the retracted position the counterpart blades 80 are disengaged from the plurality of drivers 82 and positioned outside the flow of crop material moving between the discharge hood 66 and the conveyor rotor 74, thereby not interfering with the drivers 82 and the discharge hood 66 cooperating to condition the crop material moving therebetween. When the plurality of counterpart blades 80 are disposed in the deployed position, the counterpart blades 80 are engaged with the plurality of drivers 82 and positioned within the flow of crop material moving between the discharge hood 66 and the conveyor rotor 74 for cutting the crop material. In this configuration, the first edge 132 of the drivers 82 may be implemented as the non-cutting edge 136 shown in FIG. 13, with the crop being cut by a sharpened knife edge of the associated counterpart blade 80.

The detailed description and the drawings or figures are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

What is claimed is:

1. A harvesting machine comprising:

a frame structure;

a cutter coupled to the frame structure and operable to cut standing crop material;

a conveyor rotor rotatable about a rotor axis and a plurality of drivers mounted to an exterior surface of the conveyor rotor;

a discharge hood mounted to the frame structure above the conveyor rotor;

wherein the conveyor rotor is configured for rotation about the rotor axis in a first rotational direction for moving crop material over the conveyor rotor, between the discharge hood and the conveyor rotor, for conditioning the crop material;

wherein the conveyor rotor is configured for rotation about the rotor axis in a second rotational direction, opposite the first rotational direction, for moving the crop material under the conveyor rotor for cutting the crop material;

wherein each of the plurality of drivers includes a first edge that presents a first leading edge when the conveyor rotor rotates about the rotor axis in the first rotational direction, and further includes a second edge that presents a second leading edge when the conveyor rotor rotates about the rotor axis in the second rotational direction;

wherein the first edge of each of the plurality of drivers is formed to define a non-cutting edge for conditioning the crop material; and wherein the second edge of each of the plurality of drivers is formed to define a knife edge for cutting the crop material.

2. The harvesting machine set forth in claim 1, wherein each of the plurality of drivers includes a "Y" shaped configuration having a base portion mounted to the conveyor rotor, a first branch portion and a second branch portion each extending outward from the base portion to respective distal ends.

3. The harvesting machine set forth in claim 1, further comprising at least one counterpart blade, with the at least one counterpart blade mounted to the frame structure and positioned to cooperate with a respective one of the plurality of drivers for cutting the crop material.

4. The harvesting machine set forth in claim 3, wherein the at least one counterpart blade is mounted proximate a lower half of the conveyor rotor.

5. The harvesting machine set forth in claim 3, wherein the at least one counterpart blade is mounted proximate an upper half of the conveyor rotor.

6. The harvesting machine set forth in claim 3, wherein the at least one counterpart blade is moveable relative to the frame structure between a retracted position and a deployed position, wherein the at least one counterpart blade is disengaged from the respective one of the plurality of drivers when the at least one counterpart blade is disposed in the retracted position, and wherein the at least one counterpart blade is engaged with the respective one of the plurality of drivers for cutting the crop material when the at least one counterpart blade is disposed in the deployed position.

7. A harvesting machine comprising:

a frame structure;

a cutter coupled to the frame structure and operable to cut standing crop material;

a conveyor rotor rotatable about a rotor axis and a plurality of drivers mounted to an exterior surface of the conveyor rotor;

a discharge hood mounted to the frame structure above the conveyor rotor;

wherein the conveyor rotor is configured for rotation about the rotor axis in a first rotational direction for moving crop material over the conveyor rotor, between the discharge hood and the conveyor rotor, for conditioning the crop material;

at least one counterpart blade mounted to the frame structure and positioned to cooperate with a respective one of the plurality of drivers for cutting the crop material;

wherein each of the plurality of drivers includes a first edge that presents a first leading edge when the conveyor rotor rotates about the rotor axis in the first rotational direction, and further includes a second edge that presents a second leading edge when the conveyor rotor rotates about the rotor axis in the second rotational direction;

wherein the first edge of each of the plurality of drivers is formed to define a non-cutting edge for conditioning the crop material; and wherein the second edge of each of the plurality of drivers is formed to define a knife edge for cutting the crop material.

8. The harvesting machine set forth in claim 7, wherein the at least one counterpart blade is moveable relative to the frame structure between a retracted position and a deployed position, wherein the at least one counterpart blade is disengaged from the respective one of the plurality of drivers when the at least one counterpart blade is disposed in the retracted position, and wherein the at least one counterpart blade is engaged with the respective one of the plurality of drivers for cutting the crop material when the at least one counterpart blade is disposed in the deployed position.

9. The harvesting machine set forth in claim 8, wherein the at least one counterpart blade is mounted to the frame structure proximate an upper half of the conveyor rotor.

* * * * *